United States Patent [19]
Brunelle et al.

[11] Patent Number: 5,214,158
[45] Date of Patent: May 25, 1993

[54] METHOD FOR PREPARATION OF MACROCYCLIC POLY(ALKYLENE DICARBOXYLATE) OLIGOMERS

[75] Inventors: Daniel J. Brunelle, Scotia; Jean E. Bradt, Esperance, both of N.Y.

[73] Assignee: General Electric Company, Schenectady, N.Y.

[21] Appl. No.: 709,256

[22] Filed: Jun. 3, 1991

[51] Int. Cl.$^5$ ............... C07D 321/00; C08G 63/78
[52] U.S. Cl. ................................. 549/267; 528/272; 528/274
[58] Field of Search ............... 549/267; 528/272, 274

[56] References Cited

U.S. PATENT DOCUMENTS 5,039,783  8/1991  Brunelle et al. .................... 528/272

Primary Examiner—C. Warren Ivy
Assistant Examiner—A. Owens
Attorney, Agent, or Firm—William H. Pittman

[57] ABSTRACT

Macrocyclic polyester oligomer compositions comprising alkylene isophthalate or terephthalate units or the like are prepared by the reaction of a diol with a diacid chloride in the presence of a catalytic amount of at least one amine characterized by substantially no steric hindrance around the basic nitrogen atom, and an acid accepting amount of at least one other tertiary amine such as triethylamine. The reaction is conducted under substantially anhydrous conditions.

18 Claims, No Drawings

METHOD FOR PREPARATION OF MACROCYCLIC POLY(ALKYLENE DICARBOXYLATE) OLIGOMERS

This invention relates to the preparation of macrocyclic polyester oligomer compositions.

Linear polyesters such as poly(ethylene terephthalate) and poly(butylene terephthalate) are well known commercially available polymers having advantageous properties including solvent resistance. They are normally prepared by the reaction of a diol with a functional derivative of a dicarboxylic acid, typically a diacid halide or ester.

In copending, commonly owned application Ser. No. 07/608,767, now U.S. Pat. No. 5,039,783, there is disclosed a method for the preparation of macrocyclic poly(alkylene dicarboxylate) oligomer compositions. These compositions are noted for their low viscosity and consequent ease of handling. They are easily converted to linear polyesters by contact with various catalytic materials.

The method for macrocyclic oligomer preparation disclosed in said application involves the reaction of a diol with a diacid chloride under substantially anhydrous conditions and in the presence of a substantially water-immiscible organic solvent such as methylene chloride and at least one unhindered tertiary amine. Examples of suitable tertiary amines are quinuclidine and 1,4-diazabicyclo[2.2.2]octane (hereinafter "DABCO"). It is necessary to use the unhindered amine in large quantities, typically at least one mole and preferably more than one mole per mole of diol and diacid chloride combined. The reaction temperature is critical and is limited to the range from $-25°$ to $+25°$ C. At higher temperatures a proliferation of side reactions occurs, including reaction of the unhindered amine with methylene chloride or similar compounds employed as solvents and decomposition of the acylammonium salt formed by the reaction of the amine with the diacid chloride.

Various disadvantages of this process are apparent. In the first place, the unhindered amines which are required in relatively large amounts are expensive materials. In the second place, the necessity for maintaining low temperatures is a substantial inconvenience. Others include the necessity for scrupulous purification of essentially all reagents prior to their use in the process.

It is highly desirable, therefore, to develop reaction conditions for the preparation of macrocyclic polyester oligomer compositions which minimize the use of expensive reagents and which decrease the necessity for expensive and troublesome procedures such as close temperature control and elaborate reagent purification methods. The present invention provides such a method. It is based on the discovery that while an unhindered amine is necessary as a catalyst in the process, more readily available amines may be used as acid acceptors, neutralizing at least a portion and often all of the hydrochloric acid generated by reaction of the diol with the diacid chloride. Further, the use of more readily available amines enables the reaction to be conducted under a wider variety of conditions and with less need for reagent purification than was previously the case. The desired macrocyclic oligomers are nevertheless obtained in relatively high yield.

Accordingly, the invention is a method for preparing a macrocyclic polyester oligomer composition which comprises effecting contact, in the presence of a substantially water-immiscible organic solvent, between at least one diol of the formula HO-R-OH, wherein R is an alkylene or mono- or polyoxyalkylene radical containing a straight chain of about 2–8 atoms; at least one diacid chloride of the formula

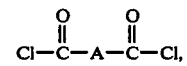

wherein A is a m- or p-linked monocyclic aromatic or alicyclic radical, said diacid chloride being substantially free from carboxylic acid; a catalytic amount of at least one highly purified unhindered tertiary amine; and a stoichiometric acid-accepting amount of at least one other tertiary amine selected from the group consisting of trialkylamines and heteroaromatic tertiary amines.

The diols employed in the method of this invention are characterized by the presence of an R value which may be an alkylene or mono- or polyoxyalkylene radical. Thus, alkylene glycols and polyalkylene glycols are included, provided the straight chain connecting the hydroxy groups contains about 2–8 atoms. Suitable alkylene glycols include ethylene glycol, propylene glycol, tetramethylene glycol, hexamethylene glycol and neopentylene glycol. Suitable polyalkylene glycols include diethylene glycol and triethylene glycol. Ethylene glycol and tetramethylene glycol are preferred.

The other reagent used to form the macrocyclic polyester oligomers is a diacid chloride containing an A value which may be an m- or p-linked monocyclic aromatic or alicyclic radical. Included are m- and p-phenylene, substituted derivatives thereof, and similarly structured cyclohexylene and cyclopentylene radicals. The m- and p-phenylene radicals, and especially p-phenylene, are preferred.

Also employed in the method of this invention is at least one unhindered tertiary amine and a substantially water-immiscible organic solvent. The essential feature of the amine is the lack of a substantial amount of steric hindrance around the basic nitrogen atom. Preferred amines of this type are polycyclic compounds with a tertiary nitrogen in the bridgehead position, as illustrated by hexamethylenetetramine, quinuclidine and 1,4-diazabicyclo[2.2.2]octane (DABCO), which have the following formulas, respectively:

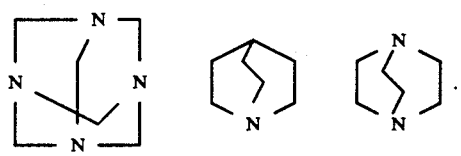

Also suitable, though less preferred because they produce the macrocyclic oligomers in lower yield, are N-methyl heterocyclic monoamines such as N-methylpyrrolidine and N-methylpiperidine, especially the former.

As organic solvents, various water-immiscible nonpolar organic liquids may be employed. Illustrative liquids of this type are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane. Chlorinated aliphatic hydrocarbons are preferred, with methylene chloride frequently being most preferred because of its availability and particular suitability. It is frequently advantageous to employ, in combination with the water-immiscible solvent, a more polar combined oxygen-containing solvent such as tetrahydrofuran in which the diol is soluble to facilitate dissolution thereof.

Finally, the method of this invention employs at least one other tertiary amine selected from the group consisting of trialkylamines and heteroaromatic tertiary amines. Suitable amines for this purpose generally comprise those which are oleophilic; i.e., which are soluble in and highly active in organic media, especially those used in the method of this invention. More particularly, said amines generally include those known to be useful in the preparation of polycarbonates. Reference is made, for example, to the tertiary amines disclosed in U.S. Pat. Nos. 4,217,438 and 4,368,315, the disclosures of which are incorporated by reference herein. They include trialkylamines in which the alkyl groups contain about 1-6 carbon atoms, such as triethylamine, tri-n-propylamine, diethyl-n-propylamine and tri-n-butylamine, and heterocyclic amines such as pyridine and 4-dimethylaminopyridine (which, for the purposes of this invention, contains only one active amine group). The most useful amines of this type are trialkylamines containing no branching on the carbon atoms in the 1- and 2-positions. Especially preferred are tri-n-alkylamines in which the alkyl groups contain up to about 4 carbon atoms. Triethylamine is most preferred because of its particular availability, low cost and effectiveness in the method of the invention.

The molar ratio of diol to diacid chloride is preferably about 1:1, although some variation (generally no more than about 5%) is permissible. Molar ratios of total amines to diol-diacid chloride combination are usually in the range of about 1.0–1.25:1. About 1–25 and preferably about 3–8 mole percent of total amines is usually unhindered amine, the balance being other tertiary amine.

The proportion of solvent employed in the reaction is not critical but is generally adjusted to provide concentrations of diol and diacid chloride in the range of about 0.1–0.5M. Highest yields are obtained in the range of about 0.1–0.25M.

The precise order of addition of reagents is not a critical aspect of the invention, except that the unhindered amine and diacid chloride should be prevented from coming into contact with each other prior to contact with the diol. This is necessary because the acylammonium salt which is thus formed undergoes nearly immediate decomposition by nucleophilic displacement of nitrogen from a carbon atom by the chloride ion also present in said salt.

Thus, it is within the scope of the invention to introduce the diol, diacid chloride and both amines simultaneously into the reaction vessel, with the amine being introduced either separately or in admixture with the diol. It is also within the scope of the invention to introduce the diol and diacid chloride into the reaction vessel which already contains the amines, in which case the diol and diacid chloride may be introduced separately or in admixture.

Reagent purity is a material factor in the previously disclosed method for preparation of macrocyclic polyester oligomers. It is generally necessary to put substantial effort into purification of the diol, diacid chloride, unhindered amine and solvents employed. The present invention, on the other hand, does not require extraordinary purification efforts for the diol, solvents and other tertiary amine. Purity is, however, an issue with the unhindered amine and diacid chloride. The former should be highly purified, typically by sublimation in the case of DABCO. The latter should be substantially free, both before and during the reaction, from carboxylic acid formed by hydrolysis. Thus, it is essential that the reaction conditions be substantially anhydrous to prevent hydrolysis of said diacid chloride and also of the acylammonium salt described hereinabove.

Whereas the previously disclosed method required temperatures below about 25° C., close temperature control is generally not necessary in the method of this invention. In general, the initial combination of the reagents should take place below 10° C. and most often in the range of −5° to +5° C. The temperature may rise, however, as the exothermic reaction occurs., most often to a maximum of about 40° C. which is approximately the reflux temperature of methylene chloride when employed as a solvent.

Following the reaction between the diacid chloride and diol, it is generally preferred to remove linear polyester in the form of oligomers and high polymer. The high polymer portion of the linears is insoluble in the solvents employed, and may be removed by filtration. Linear oligomers are most conveniently removed by column chromatography through silica gel or the like. Following the removal of high polymer and linear oligomers, the solvent may be removed and the cyclic oligomers recovered in substantially pure form.

The compositions prepared by the method of this invention are mixtures of macrocyclic polyester oligomers, usually having degrees of polymerization from 2 to about 12. They usually comprise predominantly dimer, trimer, tetramer and pentamer.

The invention is illustrated by the following examples. All percentages are by weight. The following abbreviations, in addition to DABCO, are employed for chemicals used:

BD—1,4-butanediol;
MC—methylene chloride;
TEA—triethylamine;
THF—tetrahydrofuran.

In each example, DABCO and terephthaloyl chloride were dried and distilled. Other reagents were similarly purified or not. as indicated.

EXAMPLES 1-4

A 3-necked Morton flask fitted with a mechanical stirrer, argon purge and septum for reagent addition was charged with 85 ml. of purified methylene chloride and with purified triethylamine and DABCO in various proportions, with a molar ratio of total amine to combined BD and terephthaloyl chloride of 1.1:1. The solutions were maintained at 0° C. and there were added over 60 minutes in an argon atmosphere, using a syringe pump, a solution of 25 mmol. of BD in 20 ml. of THF and a solution of 25 mmol. of terephthaloyl chloride in 20 ml. of MC. When addition was complete, stirring was continued for 10 minutes at 0° C., after which the reactions were quenched by the addition of aqueous hydrochloric acid solution and the mixtures were filtered through a filter aid material. The organic layers were separated, washed with aqueous hydrochloric acid solution and aqueous sodium hydroxide solution and evaporated to dryness. The products were purified by flash chromatography using silica gel and methylene chloride. Crude product yield and percentage of impurities were determined, the latter by uncalibrated high pressure liquid chromatography. The results are given in Table I.

TABLE I

| Example | DABCO, mole %* | Crude yield, % | Impurities, % |
|---|---|---|---|
| 1 | 2.5 | 64 | 1.01 |
| 2 | 5.0 | 78 | 0.70 |
| 3 | 10.0 | 56 | 2.33 |
| 4 | 20.0 | 59 | 1.35 |

EXAMPLES 5-16

The procedure of Example 2 was repeated on various scales, at various concentrations of BD and terephthaloyl chloride and employing various combinations of purified and unpurified reagents. The results are given in Table II; "Isolated Yield" denotes yield of macrocyclic polyester oligomers after isolation.

TABLE II

| Example | Molar conc. | Scale, mmol. | Purified reagents | Yield, % Crude | Yield, % Isolated | Impurities, % |
|---|---|---|---|---|---|---|
| 5 | 0.2 | 250 | All | — | 64 | 0.35 |
| 6 | 0.2 | 500 | All | — | 65 | 1.55 |
| 7 | 0.2 | 500 | TEA, MC, THF | — | 74 | 2.72 |
| 8 | 0.2 | 500 | TEA, THF | — | 72 | 1.38 |
| 9 | 0.2 | 500 | TEA | — | 77 | 2.21 |
| 10 | 0.2 | 100 | None | 69 | — | 4.50 |
| 11 | 0.2 | 500 | None | — | 73 | 1.58 |
| 12 | 0.2 | 2000 | None | 69 | 65 | 1.36 |
| 13 | 0.17 | 500 | None | 63 | — | 2.39 |
| 14 | 0.23 | 500 | None | 60 | — | 3.41 |
| 15 | 0.3 | 500 | None | 51 | — | 1.84 |
| 16 | 0.5 | 500 | None | 30 | — | 1.24 |

It is apparent from Table II that substantial yields of macrocyclic poly(butylene terephthalate) oligomers are obtained under all conditions employed. However, yields decrease substantially with molar concentrations above 0.25M.

A series of control experiments was conducted under the conditions of Example 10, employing unpurified DABCO. Crude yields were in the range of 38-47%, and impurity percentages were in the range of 16-24%. Thus, the need to use purified DABCO is apparent.

EXAMPLES 17-21

The procedures of Examples 8-10 were repeated, except that the temperatures of the reaction mixtures were permitted to fluctuate rather than being maintained at 0° C. The results are given in Table III.

TABLE III

| Example | Procedure | Scale, mmol. | Temp. range, °C. | Yield, % Crude | Yield, % Isolated | Impurities % |
|---|---|---|---|---|---|---|
| 17 | Ex. 8 | 500 | 4.6-32.1 | — | 75 | 1.60 |
| 18 | Ex. 9 | 500 | 21.5-39.4 | — | 72 | 3.14 |
| 19 | Ex. 10 | 50 | 3.1-30.0 | 82 | — | 2.75 |
| 20 | Ex. 10 | 50 | 2.7-8.4 | 68 | — | 3.51 |
| 21 | Ex. 10 | 50 | 5.0-30.2 | 56 | — | 4.80 |

It is apparent from Table III that close temperature control is not necessary for the purposes of the present invention.

EXAMPLE 22

The procedure of Example 10 was repeated, substituting pyridine for the triethylamine. The crude yield of macrocyclic poly(butylene terephthalate) oligomers was 49%, and the product contained 4.8% impurities.

EXAMPLE 23

The procedure of Example 10 was repeated on a 16-mole scale, with the temperature being allowed to fluctuate in the range of 4.6°-25.6° C. A product yield of 50% (isolated) was obtained; the product contained 0.62% impurities.

What is claimed is:

1. A method for preparing a macrocyclic polyester oligomer composition which comprises effecting contact, in the presence of a substantially water-immiscible organic solvent, between at least one diol of the formula HO—R—OH, wherein R is an alkylene or mono- or polyoxyalkylene radical containing a straight chain of about 2-8 atoms; at least one diacid chloride of the formula

wherein A is a m- or p-linked monocyclic aromatic or alicyclic radical, said diacid chloride being substantially free from carboxylic acid; a catalytic amount of at least one highly purified unhindered tertiary amine; and a stoichiometric acid-accepting amount of at least one oleophilic tertiary amine selected from the group consisting of trialkylamines and heteroaromatic tertiary amines.

2. A method according to claim 1 wherein the molar ratio of diol to diacid chloride is about 1:1 and the molar ratio of total amines to combination of diol and diacid chloride is in the range of about 1.0-1.25:1.

3. A method according to claim 2 wherein the amine and diacid chloride are prevented from coming into contact with each other prior to contact with the diol.

4. A method according to claim 3 wherein the solvent is a chlorinated aliphatic hydrocarbon and the temperature is from about −5° to about 40° C.

5. A method according to claim 4 wherein the diacid chloride is isophthaloyl or terephthaloyl chloride.

6. A method according to claim 5 wherein the hindered amine is diazabicyclo[2.2.2]octane, quinuclidine, N-methylpyrrolidine or hexamethylenetetramine.

7. A method according to claim 6 wherein the deophilic tertiary amine is a trialkylamine in which the alkyl groups contain about 1-6 carbon atoms.

8. A method according to claim 7 wherein the diol is ethylene glycol, propylene glycol, tetramethylene glycol, hexamethylene glycol, neopentylene glycol or diethylene glycol.

9. A method according to claim 8 wherein the unhindered amine comprises about 3-8 mole percent of total amines.

10. A method according to claim 9 wherein the solvent is methylene chloride.

11. A method according to claim 9 wherein the diol is ethylene glycol.

12. A method according to claim 9 wherein the diol is tetramethylene glycol.

13. A method according to claim 9 wherein the unhindered amine is diazabicyclo[2.2.2]octane.

14. A method according to claim 9 wherein the unhindered amine is quinuclidine.

15. A method according to claim 9 wherein the unhindered amine is N-methylpyrrolidine.

16. A method according to claim 9 wherein the deophilic tertiary amine is triethylamine.

17. A method according to claim 9 wherein the diacid chloride is isophthaloyl chloride.

18. A method according to claim 9 wherein the diacid chloride is terephthaloyl chloride.

* * * * *